United States Patent [19]

Mallinson

[11] 4,373,805
[45] Feb. 15, 1983

[54] LASER ALTIMETER AND PROBE HEIGHT SENSOR

[75] Inventor: Richard B. Mallinson, Binghamton, N.Y.

[73] Assignee: The Singer Company, Binghamton, N.Y.

[21] Appl. No.: 228,858

[22] Filed: Jan. 27, 1981

Related U.S. Application Data

[63] Continuation of Ser. No. 35,877, May 3, 1979, abandoned.

[51] Int. Cl.³ ............................ G01C 3/08; G01C 3/10; G09B 9/08
[52] U.S. Cl. ............................................. 356/4; 356/1
[58] Field of Search ......................... 356/1, 4; 35/12 N

[56] References Cited

U.S. PATENT DOCUMENTS

| | | | |
|---|---|---|---|
| 3,520,070 | 7/1970 | Gibson | 35/12 N |
| 3,631,610 | 1/1972 | Cutler | 35/12 N |
| 3,914,011 | 10/1975 | Mallinson et al. | 350/50 |
| 4,248,532 | 2/1981 | Nosler | 356/1 |

FOREIGN PATENT DOCUMENTS

| | | | |
|---|---|---|---|
| 728860 | 3/1966 | Canada | 356/1 |
| 2027548 | 10/1970 | France | |
| 49115 | 7/1965 | Luxembourg | |
| 994756 | 6/1965 | United Kingdom | |
| 1291066 | 9/1972 | United Kingdom | |
| 1527413 | 10/1978 | United Kingdom | 35/12 N |
| 79/00189 | 4/1979 | PCT Int'l Appl. | 356/1 |

*Primary Examiner*—S. C. Buczinski
*Attorney, Agent, or Firm*—Jeff Rothenberg; Douglas M. Clarkson

[57] ABSTRACT

The disclosure describes an arrangement to measure precisely probe-to-model board distance in a simulator. A source of radiation is positioned to emit a beam toward a model board surface on which a scaled terrain model is constructed. A fixed position lens collects reflected radiation and directs it onto a sensor device which develops an electrical signal indicative of displacement of the reflected beam, which, in turn, varies directly as the distance between the probe and the model board surface. One embodiment describes an arrangement in accordance with the Scheimpflug condition whereby focus is maintained without certain for the depth of field as the probe approaches and withdraws from the surface of the model board.

6 Claims, 7 Drawing Figures

LASER ALTIMETER AND PROBE HEIGHT SENSOR

The Government has rights in this invention pursuant to Contract N61339-76-C-0086 awarded by the Department of the Navy.

This is a continuation application of prior application Ser. No. 35,877 filed on May 3, 1979 of Richard B. Mallinson, now abandoned.

The present invention relates, generally, to the field of simulators and, more particularly, to a new and improved laser altimeter and probe protection device for use in a camera-model visual system of a simulator.

BACKGROUND OF THE INVENTION

Recent advances in technology, particularly in the area of tactical aircraft, have resulted in aircraft with greatly expanded performance capabilities and have produced a corresponding demand for expanded simulator training capabilities into areas not involved in the past. One of the most important of these areas is low altitude flight, as found in nap-of-the-earth and terrain-following instances.

Highly accurate altitude-measuring instrumentation that has been developed to permit aircraft to operate effectively in these areas, such as radar altimeters, has created new problems in visual and instrument simulation. The present invention is especially concerned with solving one of the problems inherent in visual simulators in such nap-of-the-earth (NOE) instances.

In the simulator field, visual images are often generated using a camera-model board system in which a TV camera views a reduced scale terrain model through an optical probe. Low altitude operation implies close approach distances to the model board surface. Therefore, an effective probe protection device is needed to permit prolonged operation in this area without the risk of probe damage and damage to the model board surface when a trainee makes a mistake. The need for maximum image quanlity is paramount in a low-altitude simulator, to provide the pilot-trainee with cues which are as realistic as possible.

More and more procurement specifications are requiring correlated, highly accurate simulators of altitude-measuring instrumentation. This implies some means of measuring actual distance to the model as the probe is traveling over it in an analog of the vehicle movement path.

In order to appreciate the requirements that constitute an effective nap-of-the-earth (NOE) visual helicopter simulator device, it is necessary to define certain terms. "Nap-of-the-earth" flight is flight as close to the earth's surface as vegetation or obstacles will permit, while following generally the contours of the earth's surface. In FIG. 7, there is shown a pictorial representation of NOE and how it relates with other low altitude flying.

A "model board surface" is a scaled model of the actual terrain over which the vehicle is to move. The overall size of such a model board can be, for example, 65 feet long and 25 feet high, and the scale for the model board typically ranges between 500:1 to about 2500:1.

The optical probe itself is available commercially as a special design that permits effective nap-of-the-earth training in a simulator apparatus. A long snout, part of the probe configuration, permits simulated maneuvering in and out of trees, hills, etc., and minimizes shadows in small confined areas. Due to the closeness of the probe to the model board surface, probe protection is essential to prevent damage by a trainee.

DESCRIPTION OF THE PRIOR ART

Such protection in the past has consisted of a mechanical pushrod sensor on the bottom of the probe, extending 0.5 millimeters below the bottom of the rear portion of the probe tip. This provides final protection of those areas which are flat enough, such as landing zones. In addition, there is a calibrated software protection system over designated landing sites, as well as above highest terrain points in areas where landings or NOE operations are not required.

Such software limits the lowermost altitude to which the probe is permitted to go, as well as limiting maximum sink rates and, in elevated regions, closure rates. Software for this form of probe protection, which limits the lowest altitude, is customarily under an instructor's control. There have been hardware protection features also to protect the probe which, in addition to the contact sensor switch, include microswitches and hydraulic bumpers to limit gantry excursions at the ends of its travel. Additionally, hard stops will limit the probe excursion over the stage field and over other landing zones at the same elevation.

None of these past efforts permit "measuring" distances and altitudes, in the simulator field, and the prior patented efforts provide few, if any, solutions to present-day simulator problems which involve today's more advanced technology.

For example, U.S. Pat. No. 3,610,754 relates to a method for determining real distances using a pulse laser and a television camera, and by counting time intervals, distance is computed.

In like manner, U.S. Pat. No. 3,954,335 teaches the use of a laser beam that is deflected periodically by a piezoelectric vibrated mirror. The time in the sweep cycle at which the beam is reflected from an object to a detector is a measure of real distance.

Notwithstanding all of the prior development efforts in the simulator field and notwithstanding the prior patented efforts in real situations, it is apparent that there is still a need for a relatively simple structural arrangement, with no moving parts, to provide an electrical signal output indicative of simulated altitude above a model board surface with a sensitivity and accuracy that is comparable to the instruments used in actual or real situations. Moreover, these past patented efforts have not been concerned with the problem of protecting a simulator probe which moves in very close proximity to a scaled model of actual terrain scenes.

SUMMARY OF THE INVENTION

The above problems are solved by the present invention which measures precisely probe-to-model board distance in a simulator. A structure in accordance with the invention is adaptable equally to a present need as well as to a retrofit program on existing simulators now in use.

Accordingly, it is an object of the invention to provide a new structural arrangement for a radiation altimeter that is adapted for simulator use and is adapted also to the protection of a simulator probe as it moves across the surface of the model board.

In the broader aspect of the present invention, a source of radiation emits a beam which is directed toward a model board surface on which a terrain model is constructed to a predetermined scale. The radiation source is attached to the simulator probe structure and moves with it. Any point on the radiation beam which comes into contact with the model board surface is reflected in focus onto a sensor device; the sensor being mounted for movement with the simulator probe and in fixed relation to the radiation source. A determination of the displacement of the radiation beam reflected from the surface, therefore, provides a measure of the distance to the surface.

In a presently preferred embodiment of the invention, a laser emits a beam which is directed toward a predetermined surface on which is constructed a terrain model to a predetermined scale. A linear sensor is mounted in a predetermined spatial relationship with the laser to provide an electrical signal output indicative of the linear location of a sensed reflected beam. A suitable lens to focus the radiation that is reflected from the surface onto the sensor means is mounted also in a fixed spatial relationship with the laser and with the linear sensor. A plane which includes the laser beam, a plane which includes the linear sensor and a plane through the lens are arranged to intersect along a common line, so that the linear sensor is in an "in focus" condition over its entire range of use.

Further objects and features of the invention will be apparent from the following specification and claims when considered in connection with the accompanying drawings.

DESCRIPTION OF THE PREFERRED EMBODIMENT

Figure 1:
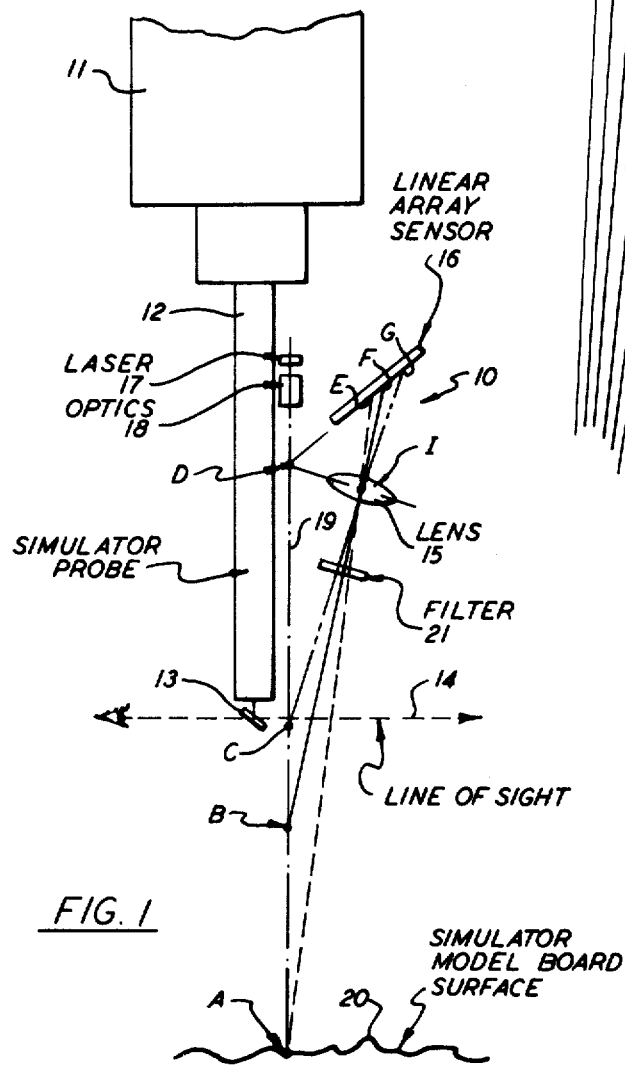
FIG. 1 illustrates in diagrammatic form the principal component parts and their interrelationship in accordance with the invention.

FIG. 1 of the drawings illustrates in diagrammatic form the principle of the probe height sensor in accordance with the invention.

Referring now to FIG. 1 of the drawings, a probe height sensor is identified generally by the reference numeral 10 and is mounted for movement directly on a probe 11 having a long snout 12. The lowermost end of the snout 12 has a mirror 13 to permit a trainee who is operating the simulator apparatus to have a line-of-sight as indicated by the dotted line 14.

This diagrammatic illustration of the probe height sensor 10 shows how the essential elements are related in accordance with a principle that has come to be known as the "Scheimpflug condition". This condition is set forth in substantial detail in U.S. Pat. No. 751,347 to T. Scheimpflug, which issued on Feb. 2, 1904.

The Scheimpflug condition requires that for each point along the line AC to be reflected "in focus" on the line EG, then the plane including the line AC, the plane including the line EG and the plane of the lens 15 must intersect along a common line, which is perpendicular to the paper and is indicated by D in FIG. 1.

The point A in FIG. 1 represents the maximum altitude condition, the point B represents an intermediate altitude condition and the point C represents a minimum (or "zero") altitude condition of the probe 11. A lens 15 serves to collect and to focus reflected light onto the surface of a linear sensor 16. For the lens 15 to be effective equally in a "negative altitude" situation (as when slowly approaching a rising obstruction), the plane of the lens 15 is perpendicular to a line from the point C.

A laser beam generator 17 serves as a source of radiation, either continuous or intermittent, although continuous is preferred in this case, which is focused by means of suitable optics 18 on a spot indicated at C, representing the "zero" altitude. The laser beam of radiation from the generator 17 is indicated by the reference numeral 19 which impinges upon a simulator model board surface 20. The radiation that is reflected from the model board surface 20 is filtered by a suitable filter 21.

The filter 21 is desirable to ensure that the sensor, which otherwise is sensitive to a broad range of wavelengths, will respond principally to the projected beam, with a minimum response to the general model board illumination. The use of a laser for the radiation beam is particularly advantageous, since its energy is nearly monochromatic (at 850 nanometers in the laser chosen for use in models of the height sensor developed to date), allowing the use of a very narrow band filter which will minimize the background illumination picked up without excluding a significant amount of the laser light, the choice of 850 nanometers or some other 'appropriate' infrared wavelength has the advantage that the camera used for the simulation visual system has negligible response, avoiding the appearance of a unnatural spot in the field of view.

The lens 15 then collects all of the radiation at the 850 nanometer frequency and serves to direct it more accurately into one spot on the sensor 16. When a probe 11 is at maximum altitude, the radiation beam 19 impinges upon the model board surface 20 at point A and is reflected as indicated by the line AE. At any intermediate altitude, the point B indicates a source of reflected light along a line BF, and at a minimum altitude, a point C indicates a source of reflections along a line CG.

Figure 2:
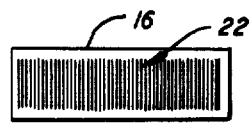
FIG. 2 illustrates diagrammatically the linear array of the sensing elements used in the sensor of FIG. 1.

The sensor 16 is illustrated better in FIG. 2 of the drawings wherein it is shown how the linear array of individual sensing elements 22 are arranged, so that, where a point of light E, F or G falls on these linearly arranged sensing elements 22 is indicative of the altitude in the simulator.

Figure 3:
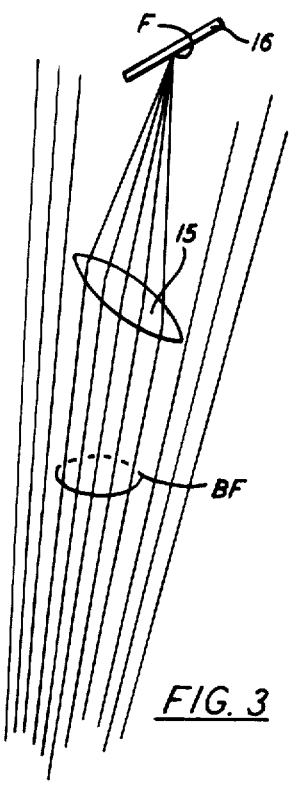
FIG. 3 is a representation of some of the reflected rays being gathered and focused into a beam.

FIG. 3 illustrates the many rays of the laser beam that are reflected in many different directions from the model board surface. Assuming the model board surface is at point B, in FIG. 1, then those rays represented by the line BF, in FIG. 1, are collected by the lens 15, FIG. 3, and are focused by the lens 15 onto the linear array sensor 16 at point F.

Figure 4:
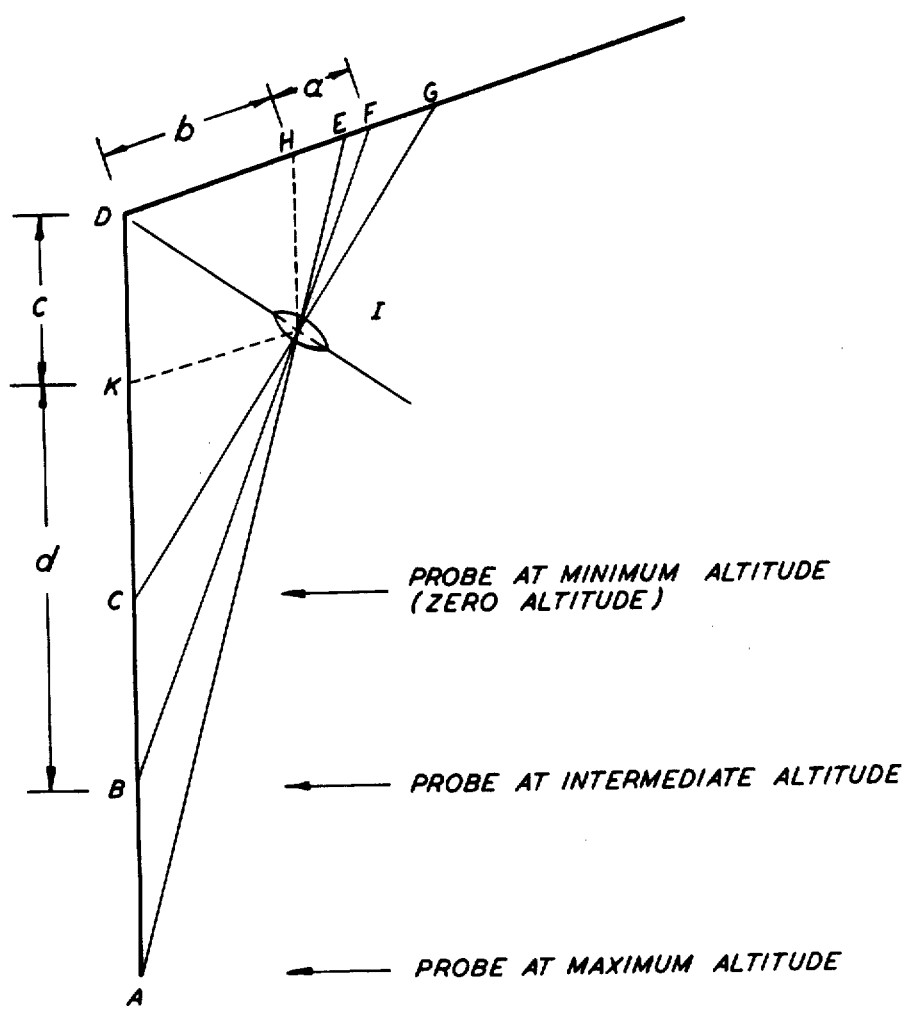
FIG. 4 illustrates the mutual perspective relationship of several image points, the planes of which intersect one another in the same straight line.

It is important to understand exactly how the Scheimpflug condition functions, and therefore, an illustration is shown in FIG. 4 arranged like the elements are shown in FIG. 1 in order to explain this function better. In FIG. 4, the point D is the point of location for the laser beam generator (or other source of a concentrated radiation beam). The line DA, therefore, represents the object plane of the lens, the line DG represents the image plane of the lens and the lens, being centered at I, has its principal plane along the line DI. Therefore, the object plane, the image plane and the lens plane all meet at D, in accordance with the Scheimpflug condition for the points A, B and C to be imaged at the points E, F and G, respectively, in an "in focus" condition.

A line drawn through I parallel to DG will intersect the line DA at K, and a line drawn through I parallel to DA will intercept DG at H, forming a parallelogram DHIK. Assuming that the model board is at an intermediate altitude (point B), note that the triangle HFI is mathematically similar to the triangle KBI. Therefore, the following relationship obtains:

HF:HI::KI:KB

Since DHIK is a parallelogram, $DK = HI$, and $DH = KI$,

Therefore, substituting equal sides, the following relationship obtains:

HF:DK::DH:KB,

Using the algebraic quantities a, b, c and d, for the length of the lines HF, DH, DK and KB, respectively, the above statement of proportion becomes the following equation:

$$a/c = b/d. \quad (1)$$

Therefore, if the quantity, "a", can be obtained by noting where the image of the point B is detected at F, the above relationship may be solved for the length d, as follows:

$$d = bc/a. \quad (2)$$

The linear array sensor 16, in the presently preferred embodiment of the invention, contains a plurality of separate sensing elements, and determination of which element received energy from the laser beam, therefore, provides a measure of the distance from the probe to the model board surface along the laser beam.

Conversion of the electrical output information from the sensor 16 to actual distance is done preferably in a computer. Generally, however, a readout of the electrical information generated by the sensor 16 is accomplished by a serial shifting operation performed directly in the integrated circuit device in as little as one millisecond, although 33 milliseconds is acceptable for normal simulator use.

The linear array sensor 16 consists of a linearly arranged plurality of 1024 separate elongated sensing elements, each one being separated from the adjacent sensing element by a space of 0.0001". The entire sensing area is defined by an aperture 0.017" wide and extending the full length of the array.

There are no moving parts in the probe height sensor 10 (FIG. 1); the laser points straight at the model board surface just in front of the probe (as the probe moves), and since the laser spot on the model board surface will be somewhere along this line AD, the optics are arranged so that points on this line—from the probe tip to a point of 3 inches below—are simultaneously focused on corresponding points on the linear array sensor 16. Space limitations often require the optical paths to be folded with mirrors, as will be explained in more detail presently, and it can usually be made to fit a particular space requirement.

In flight training simulators, probe protection has been a problem. In a nap-of-the-earth type of simulator, most of the movement is below the tree top level, and a sudden approach to an upgrade or some other type of obstruction can result in damage to the probe unless it is retracted quickly, but such action, if automatic, could be negative training for the trainee. In this instance several alternatives are available, such as, the visual scene may be blanked out completely, or it may flash intermittently, or the instructor may receive an indication that automatic pull-up has occurred or finally, an indication can be given to both a trainee and the instructor that a crash has occurred. In any event, both the probe and the model board surface are protected from damage.

The laser spot is not formed by perfectly parallel light. However, it is focused by the lens 18. A point near the probe tip (point C) is selected on which to focus the laser beam in order to optimize accuracy at that point, at the expense of the spot size at the high altitude end. Even though the spot is permitted to spread over multiple elements at the higher altitudes, this is compensated for in the electronics in any one of several ways. In the illustrated embodiment of the invention, the center element of the spread is located at any one of several well-known techniques.

An example of an acceptable technique for locating the center element in the spread exposed to the laser spot is one which permits each element o store charges determined both by the amount of radiation falling on them and the length of time that radiation has been falling on them and the length of time that radiation has been falling on them since the last time that the elements were read out. As readout occurs, therefore, these charges are presented to the output as a series of analog values of different magnitudes. The array of sensing elements in which each charge originated is identified by a counter which is incremented as the readout proceeds.

The signals from the array are passed through a discriminator and the count is recorded when the signal goes above and below the discriminator level. These two counts are then averaged to yield the center count. Use of the discriminator makes the device relatively insensitive to unwanted noise signals due to spurious light sources and background illumination as well as electronic noise in the sensing elements themselves.

An adequate power source for the laser beam generator 17 is 10 milliwatts for a continuous wave operation. This provides a sufficient signal-to-noise ratio to fly at high altitude and speeds over changing terrain with low reflectivity.

The beam 19 from the laser beam generator 17 is focused by a suitable objective lens 18 on the most critical spot; that is, point C.

Figure 5:
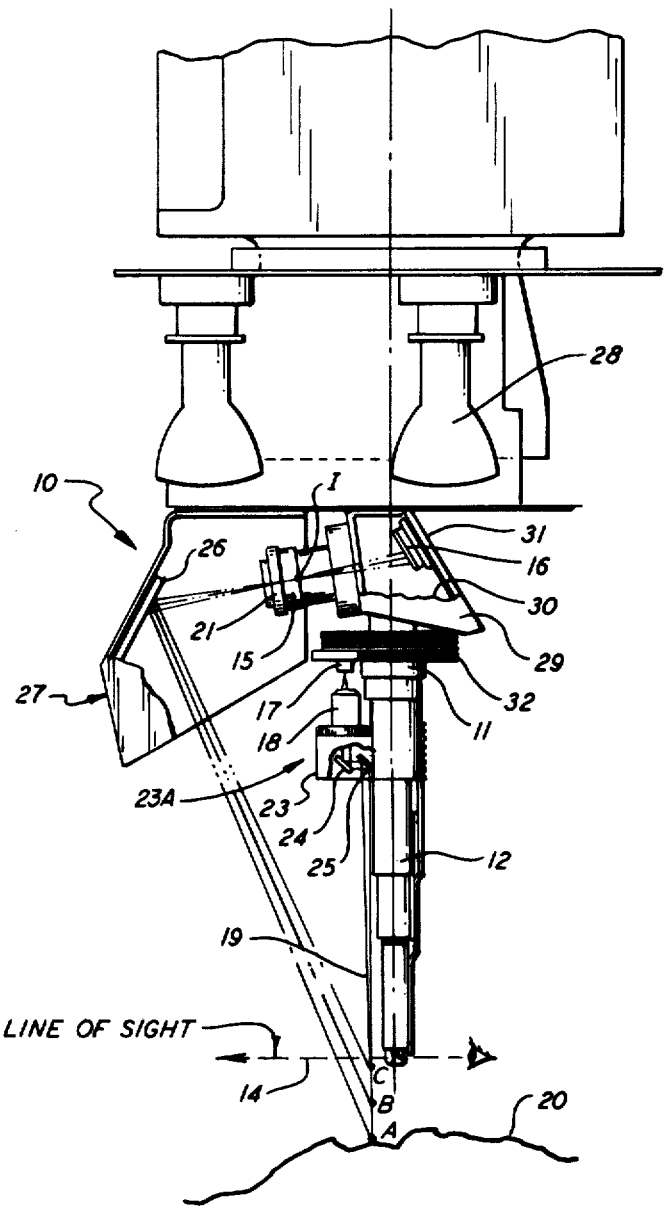
FIG. 5 is a view from one side of a structural arrangement in accordance with the principles of the invention using two mirrors to move the axis of the initial radiation beam closer to the probe and using only one mirror to fold the reflected beam toward the sensor.

Referring now to FIG. 5 of the drawings, the same reference numbers are used to identify the same or similar component parts as identified heretofore above. The probe height sensor 10 is mounted for movement directly on the probe 11 and the long snout 12. The lowermost end of the snout 12 has a mirror 13 (not visible in this view) to permit the operator to have a line-of-sight as indicated by the dotted line 14. The laser 17 emits a beam 19 which is focused by a suitable lens 18 on a point C for the reasons already described. A mirror assembly 3A consists of a suitable housing 23 to enclose two mirrors 24 and 25 in order to redirect the initial laser beam 19 to a point immediately adjacent, or contiguous with, the probe 11.

As illustrated in this FIG. 5 the model board surface 20 intersects the laser beam 19 at point A, which is at the maximum distance for the particular optical arrangement illustrated. Assume, however, that the model board surface 20 intersects this laser beam 19 at point B, which is representative of an intermediate point between A (maximum) and C (minimum). Obviously, the beam 19 will be reflected from the surface 20 in many different directions. However, only those reflected light rays contained within a cone centered on the line B1 are of interest, since they are the ones which will be picked up by the lens 15.

In order to fit the component parts within the space limitations of a particular evironment, one or more mirrors may be necessary, such as a mirror 26, for example. In this instance, a mirror 26 is positioned appropriately to fold the beam 19 that is reflected from the model board surface 20 back toward the linear sensor 16. It should be noted particularly in this view that a light shield 27 is positioned to cover the mirror and the lens 15 from extraneous light that may be emitted by reflection from those lamps positioned appropriately to illuminate the model board surface 20 (as illustrated by the lamps 28) for the purpose of the camera (not shown).

An appropriate light shield 29 is positioned to prevent extraneous reflected rays from impinging upon the linear sensor 16, visible due to a cutaway portion 30. This particular light shield 29 is positioned to cover the entire distance from a support 31 for the sensor 16 to the structure of the lens 15.

The laser beam generator 17 is cooled by a thermoelectric cooler which generates a quantity of heat and, therefore, a plurality of fins 32 serve as a "heat sink" to dissipate this heat. The thermo-electric cooler controls the temperature of the laser beam generator 17 to keep its wavelength and power output substantially constant.

Figure 6:
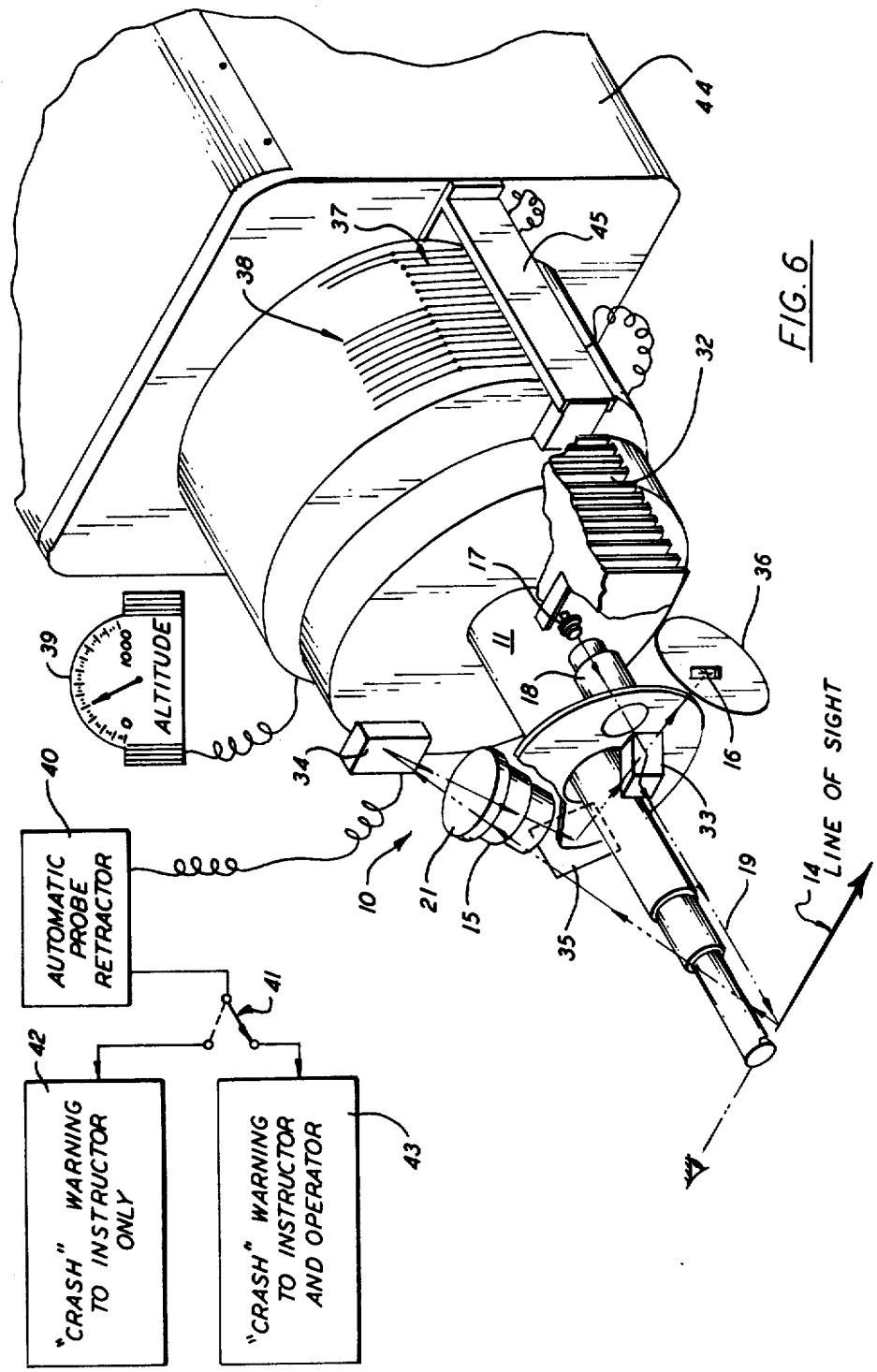
FIG. 6 shows a perspective view of a structural arrangement similar to FIG. 5 with a prism to re-direct the axis of the initial beam and using a plurality of mirrors to fold the reflected beam.

In FIG. 6 of the drawings, again, the same reference numerals are used in the other views will identify the same or similar component parts. The initial laser beam 19 is redirected from the line at which it is emitted by the laser beam generator 17 to a line contiguous with the snout 12 of the probe 11 by means of a prism 33, instead of a plurality of mirrors.

Although the model board surface is not visible in this figure of the drawings, the laser beam 19 that is reflected from such surface 20 will travel a path to a mirror 34 from which it is reflected through the filter 21, through the lens 15 and onto a second mirror 35. From the second mirror 35, the reflected beam is folded over onto the linear sensor 16. In this manner, the length of the path for the reflected laser beam is folded back over itself at least two times in order to fit the particular space requirements.

In this view, the linear sensor 16 is shown supported directly by a circuit board 36 from which, in conjunction with suitable and appropriate external circuitry, the desired electrical output is provided for indicating altitude as well as any appropriate danger of the probe from a collision with the model board surface.

In response to attitude changes in the simulated aircraft, the particular line-of-sight 14 may be changed in heading. In order for the electrical signal to be available continuously from the linear sensor 16, a plurality of brushes 37 operate effectively with a matching plurality of slip rings 38. This electrical signal then is connected to a processor which, in turn, drives an altimeter 39 to present a reading in a cockpit and/or elsewhere as desired, which reading is scaled in accordance with the particular scale of the model board surface. To illustrate, if the snout 12 of the probe 11 is 1.2 inches from the model board surface and assuming that the scale is 1000:1, then the altimeter 39 will give a reading of 100 feet.

In like manner, assuming that the model board surface has approached the "zero" altitude point, a "crash" signal is connected directly to an automatic probe retractor circuit 40, from which a signal is connected by means of a switch 41 to either a "warning to instructor only" circuit 42 or a "warning to instructor and operator" circuit 43.

Both the probe 11 and the probe height sensor 10 are supported by suitable structure indicated by the reference numeral 44 and relative to which the probe along with the probe height sensor is rotatable. Therefore a block 45 is supported directly by the structure 44 in a fixed relationship so that the slip ring 38 may be turned relative to the fixed position of the brushes 37.

Figure 7:
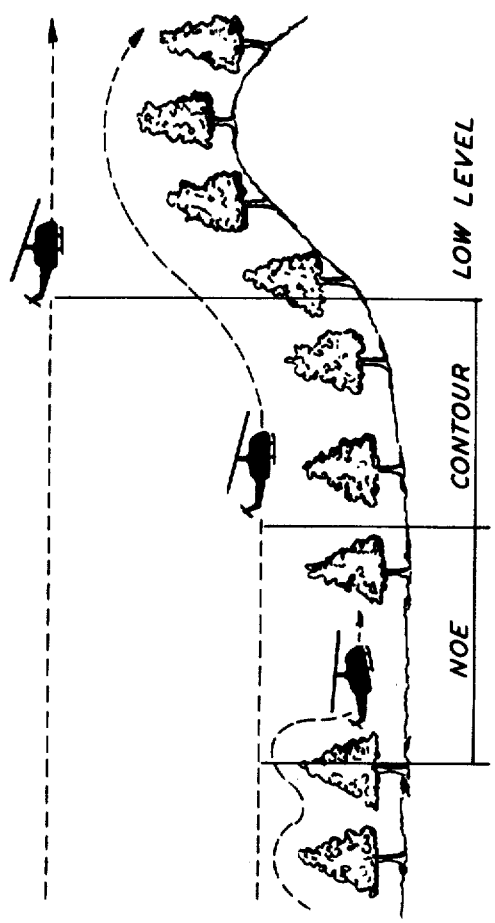
FIG. 7 is a pictorial representation of three different forms of low altitude flight.

In FIG. 7 of the drawings, three different flight attitudes for a helicopter are shown pictorially to illustrate three different low altitude flight conditions. A low level flight is indicated by a helicopter flying substantially level just above the highest anticipated point on an uneven terrain. Another helicopter takes what is termed a contour flight which passes just above a majority of the obstructions but must rise up above such items as occasional hills, occasional buildings and the like. The third flight condition is termed "nap-of-the-earth" in this situation, the helicopter flies just above the ground level regardless of obstructions. Accordingly, its flight must be constantly rising from the earth, lowering down, turning left and turning right to go around various obstructions also. Some of the problems which are encountered in a simulator apparatus may be understood more readily when it is realized that, on a 1000:1 scale terrain model, a 50 foot tree is represented by an obstruction measuring actually only 0.6 inches.

A structure in accordance with the present invention, however, is sufficiently sensitive and accurate to provide actual readings of scaled altitude as well as to provide automatic probe retractor signals even when operating under this kind of tolerances.

In view of the above detailed description of the preferred form of the invention and in view of the above-mentioned modifications thereto, other modifications, variations, advantages and uses will occur to one skilled in this art. Accordingly, the descriptions and modifications presented hereinabove are to be considered as illustrative only, the true spirit and scope of the invention being that defined by the claims appended hereto.

I claim:

1. In a simulator for providing training in low altitude operation of a flight vehicle, a visual system comprising:
    a model board surface on which is arranged a scaled model of a predetermined terrain, an optical probe for providing a line-of-sight along said terrain on said model board surface, a laser light source mounted on said optical probe for directing a substantially continuous beam of high intensity light along an axis toward said model board surface to be reflected therefrom, sensor means mounted on said optical probe in a fixed spatial relationship to said laser light source for developing an electrical signal output indicative of displacement of said laser light that is reflected from said model board surface, said sensor means having a plurality of separate elongated sensing elements uniformly arranged in a linear scanned array, first optical lens positioned on said axis to focus said beam of high intensity light sharply at a predetermined point of "minimum" altitude just below the end of said optical probe, second optical lens positioned to focus at least a portion of said laser light that is reflected from said model board surface to a point on said sensor means, said second optical lens being positioned substantially perpendicular to a line from said predetermined point of "minimum" altitude just below the end of said optical probe, and said linearly arranged sensing elements being positioned in a first plane including all of said sensing elements, such that said first plane and a plane including said second optical lens will intersect said axis of the laser light source along a common line, and said common line is perpendicular to said axis of the laser light source, whereby said laser light that is reflected from said model board surface to said sensor means is in focus over substantially its entire range, with the point of sharpest focus being at said "minimum" altitude.

2. A visual system as set forth in claim 1 including a safety device responsive to said electrical signal output to retract said probe automatically just before said "minimum" altitude is reached.

3. A visual system as set forth in claim 1 including means to filter out substantially all radiation with a wave length different from that of said reflected laser light.

4. A visual system as set forth in claim 1 including altitude indicating means, and means to actuate said altitude indicating means responsive to said electrical signal output from said sensor means.

5. A visual system as set forth in claim 1 including probe retractor circuit means to retract said probe responsive to said electrical signal output from said sensor means.

6. A visual system as set forth in claim 1 including a rotatable probe, so that a line-of-sight therethrough is variable, and a brush and slipring assembly for connecting said electrical signal output from said sensor means externally.

* * * * *